P. L. BATTEY.
ART OF POWER GENERATION.
APPLICATION FILED FEB. 13, 1917.
1,253,203.
Patented Jan. 15, 1918.
3 SHEETS—SHEET 1.
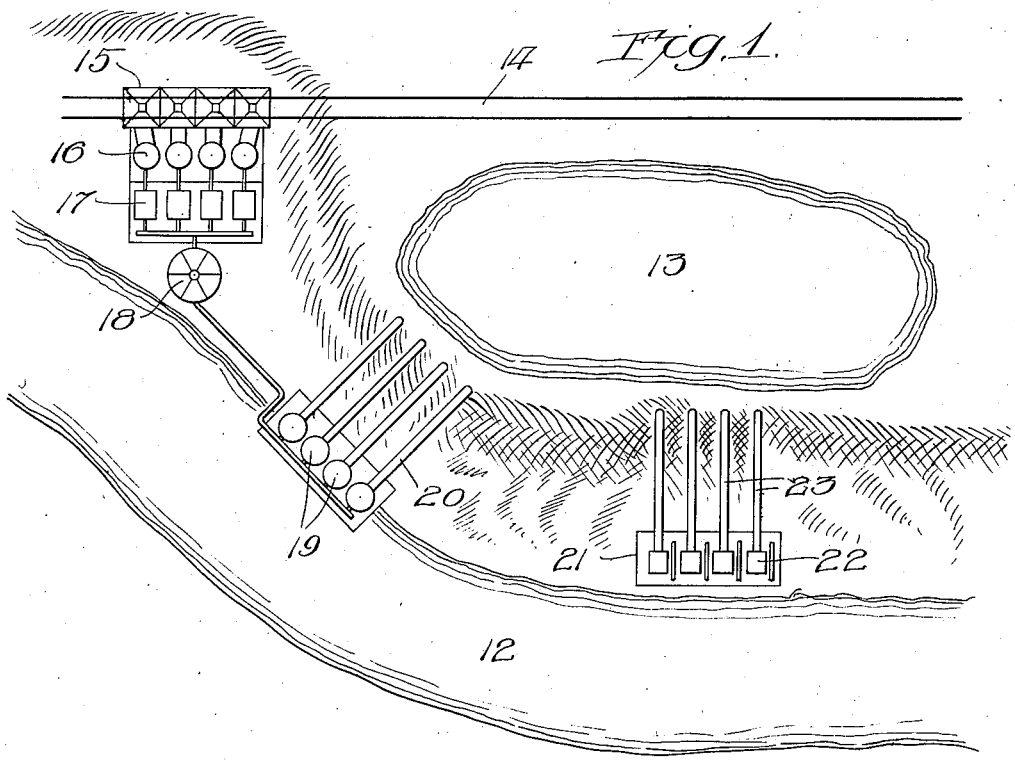
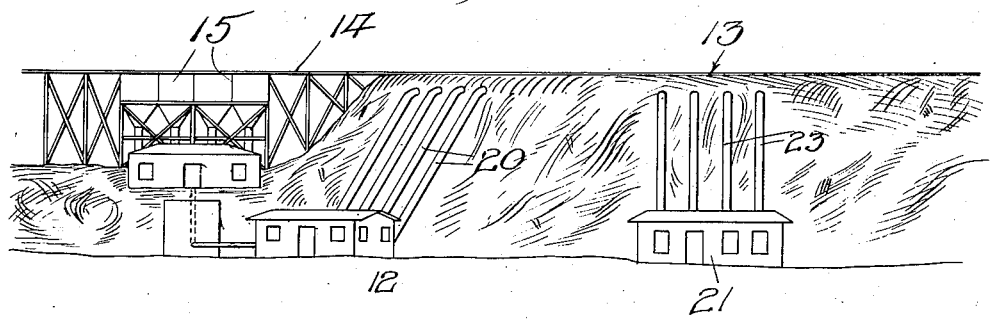

P. L. BATTEY.
ART OF POWER GENERATION.
APPLICATION FILED FEB. 13, 1917.

1,253,203.

Patented Jan. 15, 1918.
3 SHEETS—SHEET 2.

Witness:
Harry S. Gaither

Inventor
Paul L. Battey
by Lanning & Lanning
Attys

P. L. BATTEY.
ART OF POWER GENERATION.
APPLICATION FILED FEB. 13, 1917.

1,253,203.

Patented Jan. 15, 1918.
3 SHEETS—SHEET 3.

Witness:
Harry S. Gaither

Inventor:
Paul L. Battey
by Banning & Banning
Attys

UNITED STATES PATENT OFFICE.

PAUL L. BATTEY, OF GLENCOE, ILLINOIS.

ART OF POWER GENERATION.

1,253,203.  Specification of Letters Patent.  Patented Jan. 15, 1918.

Application filed February 13, 1917. Serial No. 148,438.

*To all whom it may concern:*

Be it known that I, PAUL L. BATTEY, a citizen of the United States, residing at Glencoe, in the county of Cook and State of Illinois, have invented certain new and useful Improvements in the Art of Power Generation, of which the following is a specification.

The present invention has to do with certain improvements in the art of power generation and has particular reference to certain improvements in a system or method of transformation of the static energy of fuel to the dynamic energy of motion or electricity, and has also to do with improvements in a combination of elements or apparatuses for carrying into effect the system or method of power generation to which my invention relates.

In the best steam power station practice of today, the thermal efficiency from the coal pile to the electricity lines approximates 12%; that is, only about 12% of the total available energy of the coal is actually delivered to the transmission lines and becomes available for useful application. The enormous loss of energy and power is occasioned largely by the inefficient nature of the steam engine or turbine as a thermo-dynamic unit. Furthermore, the first cost of steam apparatus is high as compared to the first cost of hydro-electric apparatus, so that the original investment and interest charges are correspondingly high.

Practically all power stations serving a public service load, such as lighting stations and the like, have a load curve which fluctuates very largely during the different periods of the day, so that the maximum demand for power very largely exceeds the average demand. Where the plant operates to deliver energy directly to the transmission line without the use of storage batteries and the like, it is necessary to provide steam generating and electricity apparatus of sufficient capacity to carry the maximum load. This means that a considerable portion of the apparatus will stand idle a considerable portion of the day, and it also means that the entire plant is forced to operate under conditions which make it impossible to secure the maximum efficiency and economy of operation. The steam generating equipment is a particularly large source or cause of loss of efficiency and economy where the plant is operating on an uneven load curve, because the boilers must be kept hot all during the day in readiness to take on the additional load as the same arrives.

Considered as a machine for converting energy from one form to another, the hydro-electric combination may be made of high efficiency, so that wherever water is available under a sufficient head and in sufficient quantity under proper conditions, the hydro-electric unit is a very desirable combination for the efficient and economical conversion of power. However, in those cases where the water is not available under a sufficient head or in sufficient quantity, it is manifestly impossible to use this type of unit, unless the water supply be reinforced or enlarged in a suitable manner. Of course, the use of turbo units is impossible where there is no water supply available.

If water could be artificially supplied under the proper head, and in sufficient quantities to meet the requirements of the turbo load, then this water could be used over and over again, being placed under pressure by a suitable pump on one portion of the cycle, and being delivered to and used in the turbo unit on the other portion of the cycle. Thereafter, the operation would be repeated, the water being taken back to the pump and sent around the circuit again. In such a case, the efficiency and economy of the entire plant for the conversion of power would be lowered proportionately according to the loss of energy in the pumping apparatus, and manifestly this arrangement would be an absurd and impracticable one in any case where the efficiency of the pumping apparatus and its economy of operation were so low that the overall efficiency and economy of the plant would be lower than that of the best steam or gas practice. In any case, however, where the efficiency and economy of operation of the pumping apparatus can be made sufficiently high to raise the total overall efficiency and economy of the plant to a point approximating or higher than that of good steam or gas practice, there will be in the combination certain advantages of a very startling and forceful nature. Among these will be the ability to use hydro-electric apparatus with all of its attendant advantages and desirable features, as well as high economy of operation, the ability to store up energy, if desired, in the form of water under hydro-static pressure or at a considerable elevation, as well as many other advantages and benefits, some of which will be explained hereafter in this specification.

I have discovered the fact that where the efficiency of a pumping unit can be raised to a point approximating 18½%–19% or higher, the overall efficiency of a plant such as I have outlined may be made at least equal to or even higher than the best practice available with steam driven or gasolene engine driven units. Consequently, I have discovered that in cases where the efficiency of the pumping apparatus considered as a thermo-dynamic engine exceeds from 18% to 19%, it may be satisfactorily used in a combination such as I have mentioned and with the attendant advantages of operation. Such pumping units are disclosed, for example, in Letters Patent of the United States, Nos. 1,037,009, and 1,057,060, issued, respectively, August 27, 1912, and March 25, 1913, both on the applications of Herbert A. Humphrey and Alberto Cerasoli, as well as the following Letters Patent of the United States, namely: Nos. 1,072,852, issued September 9, 1913; 1,084,340 and 1,084,341, both issued January 13, 1914; 1,085,865 and 1,086,326, both issued February 3, 1914; 1,152,394 issued September 7, 1915, and 1,169,540 issued January 25, 1916. I wish it to be distinctly understood, however, that in mentioning these or any other particular examples of apparatus, I do not thereby intend to limit myself to their use, either in the process or combinations of apparatus herein set forth, except as I may do so in the claims. I mention the disclosures of these patents simply as a matter of convenience and for illustrative purposes. I will state, however, that experience has shown that the type of direct fired gas pump shown in certain of these patents has been repeatedly demonstrated to produce thermal efficiencies up to 27% of the total available energy of the fuel such as the coal supplied to the gas producer.

In a simple application of the features of the present invention, a suitable gas supply is delivered to the pumps which may be, for example, of the Humphrey direct fired type. These pumps may then deliver their water to a suitable storage reservoir at a proper elevation to give the desired hydro-static head. The water from this reservoir is then delivered to the turbo generating units or other converting apparatus, wherein its static energy is converted into electricity or other available dynamic energy, and wherein the water is restored to approximately its original level. This water may then be used over again, or in some cases other water may be used. In those cases where no considerable body of water is available, an artificial body may be created for the storage of a desired amount of water at the upper elevation and for the reception of the required amount of water at the lower elevation. Where, however, the load on the pumping apparatus may conveniently be allowed to closely follow the demand for power, so that the operation of the pumping apparatus will fluctuate correspondingly to the fluctuations of the demand for power, the use of more than a mere nominal storage capacity may be dispensed with, the water circulating directly back and forth between the pumping and turbo units.

In order that the features of my invention may be more readily understood, I will now have reference to a consideration of the accompanying drawing, wherein—

Figure 1 shows a plan view of a simple application of the features of the present invention to a location in which the plant may be conveniently constructed adjacent to a stream of water, or alongside of a pond;

Fig. 2 shows diagrammatically an elevation corresponding to Fig. 1;

Figure 11:
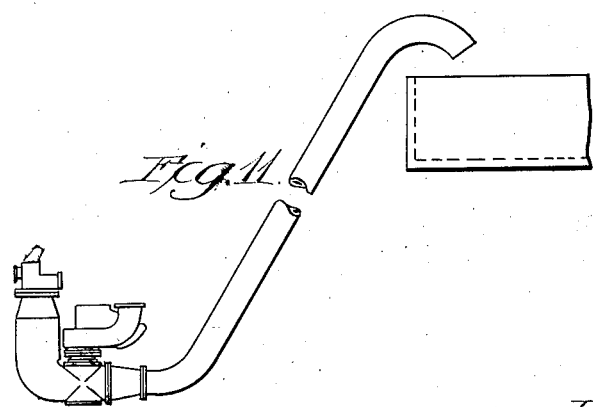
Fig. 11 shows in detail one form of pumping head for a direct fired pump, being the construction disclosed in Letters Patent of the United States, No. 1,057,060, of March 25, 1913.

Before proceeding to explain the various arrangements disclosed in Figs. 1 to 10 inclusive, I will refer briefly to the direct fired pump shown in Fig. 11. This pump is so constructed that the water is forced upwardly, or is placed under pressure by the direct action of an explosive charge, such as a charge of producer gas. The operation of a pump of this type is of a pulsating nature, the water being delivered in pulsations instead of as a steady stream. It is, therefore, desirable, when using this type of pump, to provide a storage tank or other equalizing device of suitable capacity to level out the inequalities of pressure and flow, due to the nature of the pumping apparatus. I will not further describe in detail the pump illustrated in Fig. 11, inasmuch as the same is fully disclosed in the various Letters Patent of the United States hereinbefore referred to, and also for the reason that I do not limit myself to the use of this type of pump, except as I may do so in the claims.

Considering first the arrangement shown in Figs. 1 and 2, the same is very well adapted for use in the application of the features of the present invention to those cases wherein the generating plant is to be located alongside of a small stream or the like. This is the stream 12. I have shown the plant as being located alongside a bluff adjacent to the bend in the stream. On the upper portion of this bluff at a suitable elevation, for example 50 feet above the surface of the stream, I provide a pond or tank 13 whose capacity will be determined largely by the conditions of operation, as will be presently explained. A track 14 serves to deliver fuel to a suitable fuel storage plant 15 from which the fuel is delivered to the gas generators 16. The gas may then be passed through a suitable purifying equipment shown at 17, and then to a tank or holder 18.

Alongside of the stream is placed a pump house 19 equipped with the desired pumping apparatus, such, for example as Humphrey direct fired pumps. I have illustrated four of these pumps 20 in the drawing. They serve to lift water from the stream up to the reservoir 13.

At another suitable point is located the hydro-electric station 21, including a number of turbo-generator units 22. These turbo generator units are connected to the reservoir 13 by the penstocks 23. The water discharged from the turbo generator units is delivered into the stream in the usual manner.

It will be observed that, with this arrangement, water is drawn from the stream by the high efficiency pumping apparatus, delivered to a suitable elevation to give the desired hydro-static pressure, and then returned to the stream through the turbo units, thereby giving up its energy. The water returned to the stream may pass on down with the flow of the stream, or it may be caught and returned to the reservoir by the pumping apparatus, so as to be sent around the circuit another time. It is, therefore, quite evident that it is not essential to locate the plant on a flowing stream, although this may be done in many cases as a matter of convenience.

It is, furthermore, to be observed, that as long as the water consumption of the turbo units is equal to the rate of delivery by the pumping apparatus, there will be a uniform flow of water up and down without changing the amount of water either in the reservoir or in the stream. However, as soon as there comes a discrepancy between the rates of water consumption and water pumping, there will be a change in the total volume of water both above and below the plant. In this case, the stream will itself perform the functions of a reservoir, and will take up fluctuations occasioned by any difference between the rates of pumping and consumption in the turbo units. It is thus possible to provide a storage capacity of sufficient size both above and below the plant to take care of the variations in the load curve, so that the pumping apparatus may be allowed to continue to operate at uniform load during the entire twenty four hours of the day, the turbo apparatus operating only according to the instantaneous demands for power. This will make a remarkably efficient and desirable arrangement, because it will permit the pumping apparatus to operate at constant load at all times, and will make it possible to operate the plant with a minimum amount of pumping capacity. This will reduce the first cost to the lowest possible figure with an attendant reduction of fixed charges, and will also permit the plant to be operated at the most economical load at all times.

Figure 3:
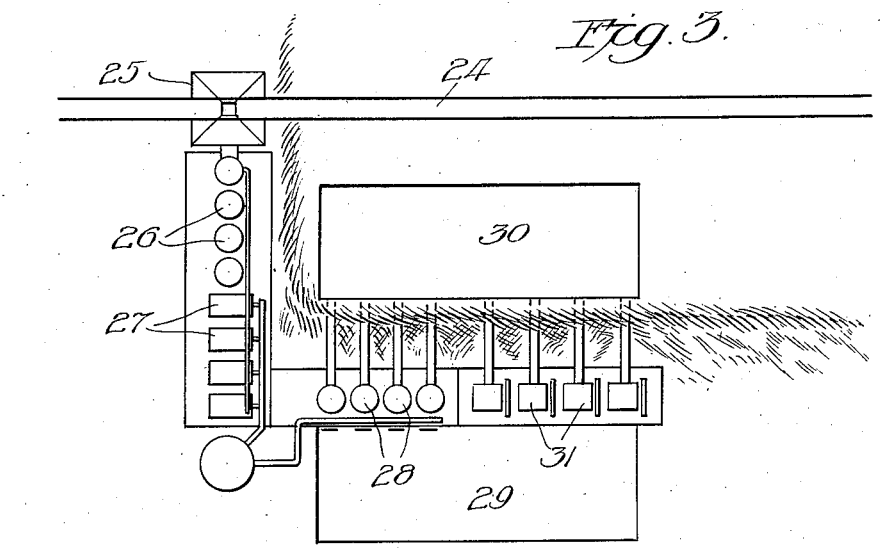
Fig. 3 shows another application of the features of the present invention to a location in which no natural body of water is available, but the plant itself is provided with artificial upper and lower reservoirs of the desired capacity.
Figure 4:
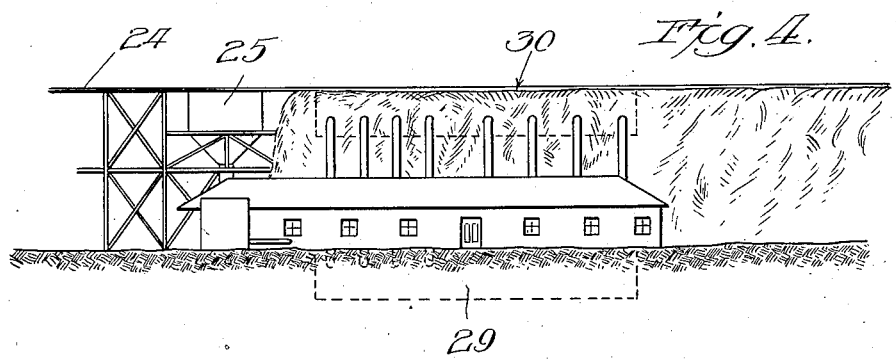
Fig. 4 shows diagrammatically an elevation corresponding to Fig. 3.

In the arrangement shown in Figs. 3 and 4, the various portions of the plant have been consolidated or brought together into a very compact arrangement and also a self-contained plant has been provided capable of operating without the use of storage ponds or reservoirs of material size. In this case, the fuel delivered over the tracks 24 reaches the fuel plant 25 and is delivered thence to the gas apparatus 26. From the gas apparatus the gas passes through the scrubbers 27 to the pumping apparatus 28. This pumping apparatus takes its water from the small artificial reservoir 29 at low level and raises it to a small artificial reservoir 30 at a higher level. The water passes down through the turbo units 31 where its energy is delivered up and the water is then restored to the lower reservoir. In this arrangement, the water circulates constantly around the circuit, being raised or placed under hydro-static pressure by the pumping apparatus and allowed to fall, and thus give up its energy in the turbo apparatus. The storage capacity is comparatively small, and consequently the operation of the pumping apparatus will follow that of the turbo apparatus during the major fluctuations of the load curve.

Figure 5:
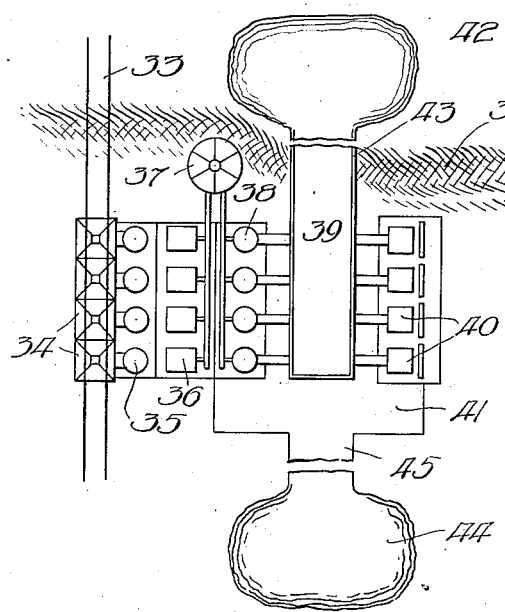
Fig. 5 shows a plan view of another possible application of the features of my invention to a location in which upper and lower storage reservoirs are provided, the same being connected to the plant by flumes or canals, as would be the case in many locations where suitable water storage capacity was not available directly at the plant.
Figure 6:
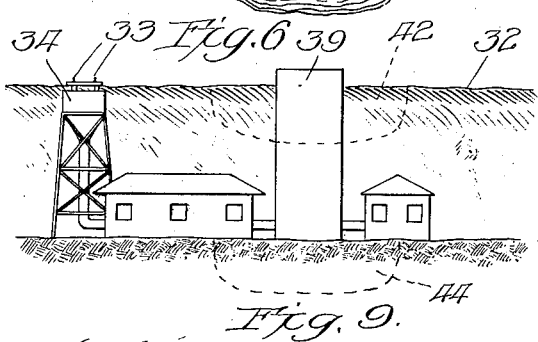
Fig. 6 shows diagrammatically an elevation corresponding to Fig. 5.

In the arrangement shown in Figs. 5 and 6, the plant is located on the side of the bluff 32. A track 33 delivers the fuel to the storage plant 34, whence it is delivered to the gas apparatus 35. The gas passes through the scrubbers 36 to a suitable holder 37, whence it is delivered to the pumping apparatus 38. This pumping apparatus raises the water to an elevated flume or the like 39 at a suitable elevation to give the desired hydro-static pressure. The water is delivered from the flume directly downward to the turbo apparatus 40, whence it discharges to a return connection 41 by which it is carried back to the intake side of the pumping apparatus. With this arrangement the water circulates directly around the circuit as long as the pumping apparatus is delivering water at the same rate as the rate of consumption by the turbo apparatus. In order to equalize a variable load curve, an upper storage reservoir 42 may be connected to the flume 39 by a canal or the like 43, and a lower storage reservoir 44 may be connected to the return connection 41 by another canal or the like 45. With this arrangement the advantages of storage capacity may be obtained even in those cases where it is desirable, on account of the high price of ground, to place the storage reservoirs at a distance from the plant. The distance at which the storage reservoirs may be located is limited only by the distance through which the water may be conveniently and properly and economically carried by the canals.

Figure 7:
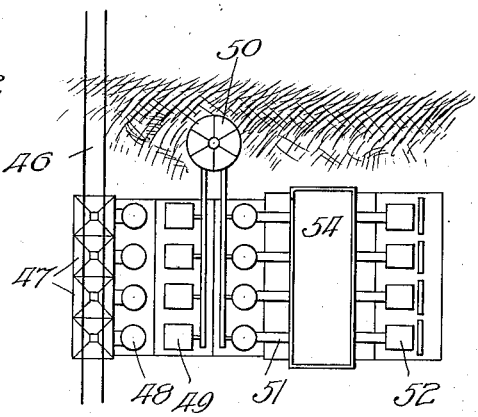
Fig. 7 shows a plan view of a self-contained plant embodying the features of the present invention, and in which the water is circulated directly back and forth between the pumping and turbo units, so that the load on the pumping apparatus closely approximates the load on the turbo apparatus, a storage tank being provided to level out any slight inequalities in the flow of water.
Figure 8:
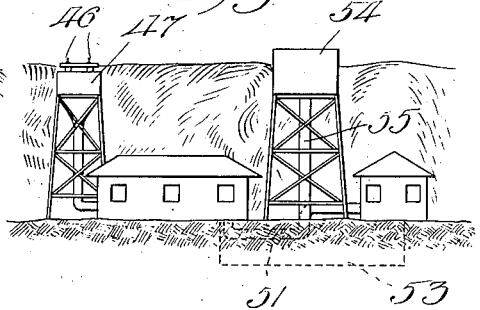
Fig. 8 shows diagrammatically an elevation corresponding to Fig. 7.

In the arrangement shown in Figs. 7 and 8, the fuel is delivered over the track 46 to a suitable storage plant 47, whence it is delivered to the gas apparatus 48. The gas then passes through the purifying apparatus 49 to a holder 50 and thence to the pumping apparatus 51. This pumping apparatus is directly connected to the turbo apparatus 52, so that the water is directly supplied under pressure without having to be elevated. The water returning from the turbo apparatus passes through a duct 53 back to the intake side of the pumping apparatus, so that it is constantly circulated around the system. A surge tank 54 is connected to the pressure side of the pumping apparatus by risers 55. This surge tank serves simply to equalize any momentary variations in flow due to the nature of the pumping apparatus and is not intended to provide a storage capacity.

Figure 9:
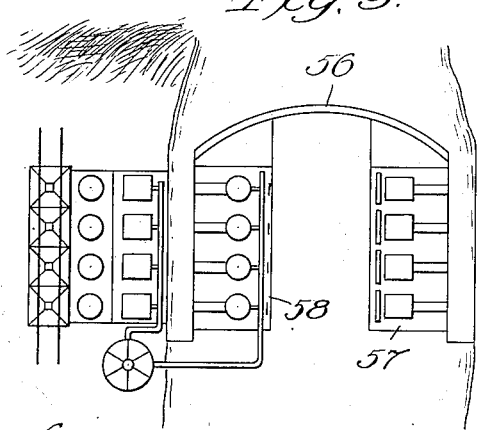
Fig. 9 shows an application of the features of the present invention to an arrangement in which it is desired to amplify the water flow for an existing hydro-electric plant, so as to make up for deficiencies in water flow at certain seasons of the year.
Figure 10:
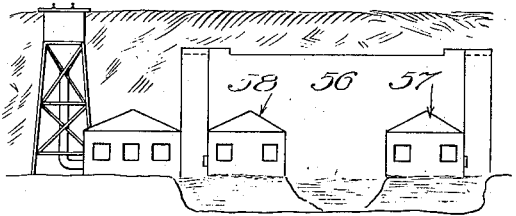
Fig. 10 shows diagrammatically an elevation corresponding to Fig. 9.

The arrangement shown in Figs. 9 and 10 is very well adapted for use in connection with many existing hydro-electric plants where it has been found necessary to provide auxiliary apparatus to carry a portion of the load at certain seasons of the year. There are many existing hydro-electric plants located on streams having such characteristics that at certain seasons of the year there is not available a sufficient water supply to carry the entire hydro-electric load, and in many such cases it has been found necessary to provide auxiliary steam apparatus to supplement the hydro-electric plant. The arrangement shown in Figs. 9 and 10 is admirably well adapted for use in such locations in place of any steam auxiliary apparatus. In the arrangement shown in this figure, the water on the up stream side of the dam 56 passes to the hydro-electric plant 57, through which it finds its way to the down stream side of the dam and gives up its energy. At a convenient point, preferably adjacent to the dam, I have provided an auxiliary pumping plant 58, the function of which is to take a portion of the water from the down stream side and return it to the up stream side of the dam so as to thus make it available for repeated use in the hydro plant. This pumping plant includes the necessary apparatus for raising the water with a high efficiency and economy of operation.

It will be appreciated that the arrangement shown in Figs. 9 and 10 presents great advantages in many localities where the stream flow is subject to considerable variations, and in addition presents the advantages that by thus supplementing the water supply, it will be possible to increase the capacity of the hydro plant in many cases beyond what would otherwise be possible. Furthermore there are many cases in which certain government regulations restrict or limit the use of the water in such ways as to limit the size and capacity of the hydro-plant. In many such cases, the features of the present invention may be readily adopted to thereby increase the possible capacity of the plant without infringing upon the government regulations.

It is to be observed particularly that each of the arrangements herein set forth constitutes a complete combination of elements coöperating together for the generation of power, available either in the form of electricity, or any other form of dynamic energy. The object in each case is to correlate a series of elements or machines, so that together the fuel may be converted into available power with a maximum possible degree of thermo-dynamic efficiency, and with a thermo-dynamic efficiency far exceeding anything which has previously been attained to my knowledge. Assuming a gas generator efficiency of 80%, a gas pump efficiency of 24%, and a hydro-electric efficiency of 80%, the overall thermo-dynamic efficiency of the plant from the coal pile to the power transmission lines would approximate 15.36%. In larger units and by the use of refinements of energy conversion which are in extended practice today, a gas generator efficiency of 85% could be attained, a gas pump efficiency of 27% could be attained, and a hydro-electric efficiency of 82% could be attained, giving an overall efficiency of 18.82% as against approximately 12% which is the best efficiency possible today in steam practice. It is thus seen that my invention and discovery herein set forth is capable of increasing the thermo-dynamic efficiency from the coal pile to the electricity lines by approximately 50% over the best present possible results.

It is also to be observed that there is a peculiar correlation or interrelation between the use of the gas pumps and the turbo units in this, that since the gas pumps are the apparatus of extremely high thermo-dynamic efficiency, they must be used in conjunction with hydraulic apparatus of suitable form to convert the hydro-static energy into available dynamic energy. Therefore, the use of turbo units is peculiarly related to the simultaneous use of gas pumps. Furthermore, inasmuch as the major portion of the available fuel exists in the form of coal or peat, and inasmuch as said fuel must be converted into gas in order to make it available for use in the gas pumps, it follows that the use of suitable gas generating equipment is also peculiarly related to the remaining elements or machines of the combination.

While I have herein shown and described only a few combinations of elements embodying the features of my present invention, I wish it distinctly understood that I do not limit myself to these combinations, except as I may do so in the claims.

I claim:

1. In a power station, the combination of a hydro-electric turbo-generator unit, a reservoir of desired capacity for impounding a desired quantity of water at a desired elevation above said unit, a reservoir of desired capacity for receiving water discharged from said unit, direct-fired gas-pumping apparatus for withdrawing water from the last mentioned reservoir and restoring said water to the first mentioned reservoir, and means for generating gas from carbonaceous material and delivering said gas to the pumping apparatus.

2. In a power station, the combination of a hydro-electric turbo-generator unit, a receptacle for impounding a desired quantity of water under a desired hydro-static head with respect to said turbo-generator unit, a receptacle of desired capacity for receiving water discharged from said turbo-generator unit, direct-fired gas-pumping apparatus for withdrawing water from the second mentioned receptacle and delivering the same to the first mentioned receptacle, and suitable equipment for generating gas from carbonaceous material and delivering the same to said direct-fired pump.

3. In a power station, the combination of a turbo-generator hydro-electric unit, direct-fired gas-pumping apparatus, means for generating gas from carbonaceous material and delivering the same to said pumping apparatus, a fluid-pressure connection between the pumping apparatus and the hydro-electric unit, and a return connection between the discharge side of the hydro-electric apparatus and the intake side of the pumping apparatus.

4. In a power station, the combination of a hydro-electric unit, gas-pumping apparatus and apparatus for generating gas from carbonaceous material and delivering the same to said pumping apparatus, a fluid pressure connection between the pumping apparatus and the hydro-electric unit, a fluid-return connection between the hydro-electric unit and the pumping apparatus.

5. In a power station, the combination of a water-driven unit, gas-pumping apparatus and apparatus for generating gas from carbonaceous material and delivering the same to said pumping apparatus, a fluid-pressure connection between the pumping apparatus and the water-driven unit, and a fluid-return connection between the water-driven unit and the pumping apparatus.

6. In a power station, the combination of water-operated apparatus, gas-pumping apparatus and apparatus for generating gas from carbonaceous material for delivering to said pumping apparatus, a fluid pressure connection between the pumping apparatus and the water-operated apparatus, and a fluid return connection between the water-operated apparatus and the pumping apparatus.

PAUL L. BATTEY.